Aug. 31, 1965  E. J. DOPERALSKI  3,203,705
PISTON RING ASSEMBLY
Filed April 22, 1963  2 Sheets-Sheet 1

INVENTOR:
EUGENE J. DOPERALSKI
BY *E. Wallace Breisch*
ATTORNEY

Aug. 31, 1965

E. J. DOPERALSKI 3,203,705

PISTON RING ASSEMBLY

Filed April 22, 1963

INVENTOR
EUGENE J. DOPERALSKI

BY *E. Wallace Breisch*

ATTORNEY

United States Patent Office 3,203,705
Patented Aug. 31, 1965

3,203,705
PISTON RING ASSEMBLY
Eugene J. Doperalski, Michigan City, Ind., assignor to Joy Manufacturing Company, Pittsburgh, Pa., a corporation of Pennsylvania
Filed Apr. 22, 1963, Ser. No. 274,571
7 Claims. (Cl. 277—150)

This invention relates to a packed piston assembly and more particularly to a packed piston ring assembly having the segments thereof shaped to maintain gapless configuration with uniform outward radial movement as a result of wear.

At the present time numerous industrial applications require compressed air which is free of hydrocarbons for various well known reasons. In order to meet these requirements it has been common practice to employ a plurality of partially overlapping carbon ring segments which are disposed to form a hollow body extending outwardly around the compressor piston and which engage the side wall of the compressor cylinder. Such a segmental carbon packing or, as more commonly known, carbon piston ring, eliminates the need for lubricating the compressor cylinder. It also has been the practice to provide one or more means spaced inwardly of the cylinder wall and engageable with one or more of the carbon segments to constantly bias each of the carbon segments radially outwardly into engagement with the sides of the compressor cylinder. Due to the configuration of the various carbon segments heretofore employed of which I am aware, gaps are formed between some of the segments and the cylinder side wall as the periphery of the ring is worn down. As can be appreciated such gaps are undesirable in compressors as they result in the loss of compressor efficiency and, since gap size is directly proportional to the segment radial wear, the radial wear is a severe limitation on machine life.

Accordingly, one object of this invention is to provide a new and improved segmental piston ring assembly of a configuration to maintain a gapless peripheral surface with uniform radial movement of all segments as the periphery of the ring wears down.

Another object of this invention is to provide a new and improved segmental piston ring assembly having radially disposed, circumferentially spaced wedge segments which have side surfaces slidably engageable with surfaces on other segments and which side surfaces are disposed at an obtuse angle to each other and lie in converging planes.

It is a specific object of this invention to provide a new and improved piston ring assembly having two sets of piston ring segments having cooperable sliding surfaces, the surfaces on each segment of one set being disposed at an angle to each other in converging planes forming a dihedral angle equal to the number of degrees in one angle of a regular polygon having a number of sides equal to the total number of segments in the two sets of segments.

These and other objects of this invention will become more apparent when taken in conjunction with the following detailed description of a preferred embodiment thereof and the following drawing in which.

Figure 1:
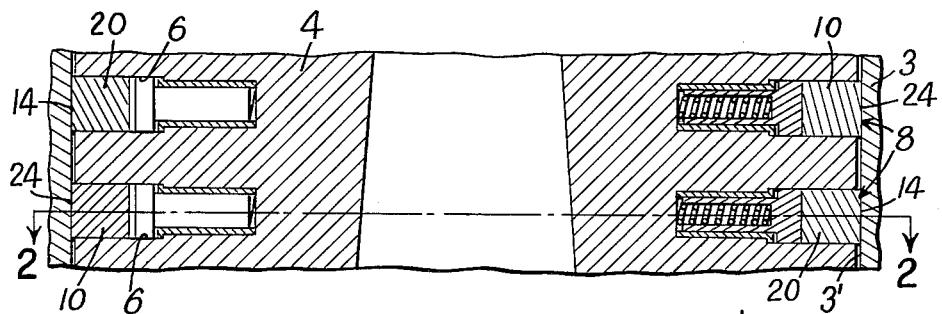
FIG. 1 is a fragmentary axial sectional view of one cylinder of a piston type compressor showing the piston, piston ring assembly and the cooperable cylinder wall.

Referring to FIG. 1 it will be noted that a portion of a conventional compressor cylinder 3 is shown in which a cylindrical piston 4 is reciprocably mounted in any suitable manner, not shown. The piston 4 is provided with a plurality of axially spaced circumferential grooves 6 in each of which a segmental packing means is located which is formed from a plurality of carbon block segments. Inasmuch as such piston and cylinder assemblies for such purposes are well known in the art, further illustration and description thereof are not believed to be warranted.

Figure 2:
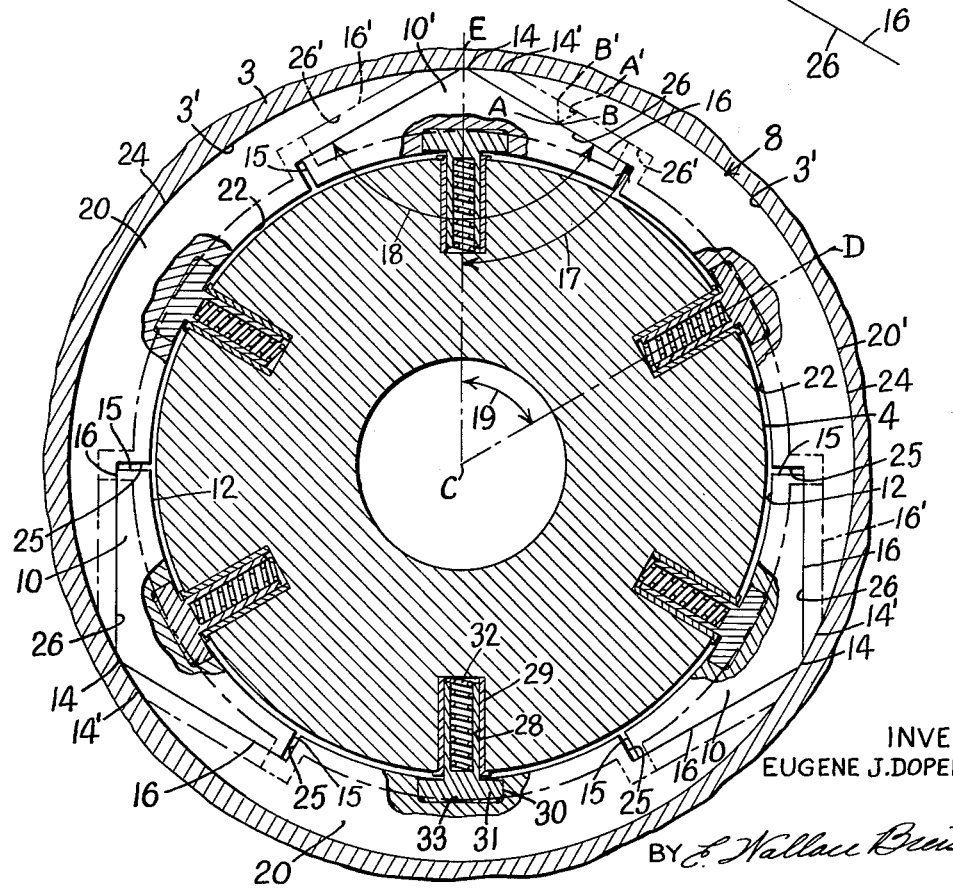
FIG. 2 is a cross sectional view taken substantially on the line 2—2 of FIG. 1.

Each of the segmental packing means hereinafter designated a piston ring assembly 8 comprises a set of identical radially and circumferentially spaced wedge shaped segments 10 which are of a thickness to be closely received between the sides of the grooves 6 and are slidably located therein. As shown in FIG. 2 each wedge segment 10 comprises an inner elongated arcuate surface 12 spaced outwardly from the bottom of the groove 6 and a shorter, arcuate surface 14 which engages the wall or bore 3' of the cylinder 3. A radially outwardly extending end surface 15 is provided at each end of the inner surface 12 to provide sufficient strength to the ends of the wedge segments 10. The surfaces 15 are connected to the cylinder wall engaging surface 14 by means of elongated side surfaces 16 extending therebetween. The angular relation of the surfaces 16 to each other forms an important part of this invention.

It will be noted (FIG. 2) that each wedge segment 10 is bisected by a plane containing the axis of the cylinder 3, each surface 16 of a wedge segment 10 forming an angle such as that indicated at 17 and equal to 60° relative to the bisecting plane and extending inwardly of the cylinder 3 so that an angle such as that indicated at 18 between the two surfaces 16 of a segment 10 is equal to two times the angle 17 or 120°. It will also be noted that as described the surfaces 16 of a wedge segment 10 lie in planes which are convergent outwardly of the outer side of the piston ring assembly. Further, the three wedge segments 10 shown in FIG. 2 are symmetrically disposed about the axis of the piston 4 so that the surfaces 16 of the circumferentially spaced wedge segments 10 if extended would form the sides of a regular hexagonal prism.

Each of the piston ring assemblies of FIGS. 1 and 2 also comprises a set of three identical radially and circumferentially spaced, elongated, arcuately shaped segments 20 which are of a thickness to be closely received between the sides of the grooves 6 and are cooperable with the wedge segments 10 to form a circular hollow body which extends outwardly of the groove 6 into engagement with the wall 3' of the cylinder 3. As shown in FIG. 2 each segment 20 comprises an inner elongated arcuate surface 22 spaced outwardly from the bottom of the groove 6 and an outer elongated arcuate surface 24 which engages the wall 3. The surfaces 22 extend arcuately between the end surfaces 15 of a pair of wedge segments 10 located adjacent to each end of each arcuate segment 20, respectively. A radially inwardly extending surface 25 is provided at each end of the surface 22 of each segment 20 to provide a recess in which the end surfaces 15 of the wedge segments 10 are located. As shown, the surfaces 25 of a segment 20 are respectively connected to the outer arcuate surface 24 by means of elongated side surfaces 26 which are coplanar with the surfaces 16 heretofore described so that the surfaces 16 and 26 are engageable, surface to surface, over at least a major portion of the area of such surfaces.

As seen in FIG. 2 each set of segments comprises three pieces with the result that the piston ring 8 is provided with a circumference made up of six separate pieces. It is to be noted that the principles of this invention, hereinafter more fully stated, apply equally well to piston rings of eight, ten, twelve or more segments and such rings are hereinafter described.

It is to be noted that regardless of the total number of segments employed in a ring assembly constructed according to the principles of this invention there must be two sets of segments having equal numbers of segments respectively. Consequently the angle between the radial center lines of any two adjacent segments (shown as angle 19 in FIG. 2) is equal to 360° divided by the total number of segments in both sets of segments.

In order to provide means for biasing the segments 10 and 20 outwardly into engagement with the bore of the cylinder 3 the piston 4 is provided with blind radial bores 28 extending inwardly from its periphery along the radial center lines of the segments 10 and 20, respectively, and coaxial therewith. Each bore 28 is provided with a hollow cylindrical elongated sleeve member 29 rigidly secured therein and slidably receiving a headed, hollow cylindrical plunger member 30 coaxial with the sleeve member 29 and the bore 28. Each plunger member 30 has a radially enlarged head portion 31 engaged in a recess 33 in the inner arcuate surface 12 or 22 of each of the segments 10 and 20, respectively. Each recess 33 is a shallow blind bore coaxial with the radial center line of the respective segment 10 or 20 and closely receiving the head portion 31 of its respective plunger member 30 so that radial movement of the segments 10 and 20 is guided along their radial center lines. The plunger member 30 is biased outwardly from the center of the piston 4 by an elongated, compression type, helical spring member 32 so that when the ring 8 is assembled as shown in FIG. 2 and inserted in the cylinder 3 all of the segments 10 and 20 are biased outwardly against the cylinder wall 3′.

It is to be appreciated that such biasing means as hereinbefore described are merely illustrative and not limitative upon this invention as biasing means for this purpose are well known.

As indicated, the purpose of this invention is to retain the sides of the segments 10 and 20 in engagement with each other as the piston 4 reciprocates within the cylinder 3. Since the segments 10 and 20 are normally formed from the same material and engage the same cylinder wall their outer surfaces will have the same wear characteristics. The lengths of the outer arcuate surfaces 14 of the wedge segments 10 are, however, considerably shorter than the length of the outer arcuate surfaces 24 of the segments 20, so that much smaller areas of the segments 10 will engage the bore 3′ of the cylinder 3 than the areas of the arcuate segments 20 which engage the bore 3′. Accordingly greater wear will tend to occur on the outer surface 14 of the wedge segments 10 so that the segments 10 will tend to move a greater distance radially outward than the arcuate segments 20. In view, however, of the engagement of the surfaces 26 with the surfaces 16, the arcuate segments 20 will restrain such movement of the wedge segments 10. By employing the segments 10 and 20, as described, the wedge segments 10 will remain in engagement with the arcuate segments 20 in a gapless configuration. As wear occurs along the arcuate surfaces 14 and 24 the segments 10 and 20 will move equal distances outwardly along a radial line coincident with the axis of the plunger 30 associated with the particular segment. For example the radial line CD illustrated for the arcuate segment 20′ which is the upper righthand segment 20 of FIG. 2 and the radial line CE for the wedge segment 10′ which is the top wedge segment of FIG. 2 show the line of motion for the segments 20′ and 10′ respectively. As the segment 20′ moves outwardly along line CD its side surfaces 26 will move outwardly in the same direction to a new position shown in dot and dash outline as surface 26′, parallel to the original surface 26, while the surface 16 of the wedge segment 10′ moves outwardly along the line CE but remains coplanar with the line 26′ and is indicated as 16′. After such wear and such motion the short arcuate surface 14 of the wedge segment 10′ becomes a much elongated surface 14′ as shown in FIG. 2 compensating for the shortening of the arcuate surfaces 24 and maintaining the gapless configuration desired for the external surface of the piston ring 8. The coplanar engagement of the surfaces 16 and 26 and the gapless configuration hereinabove described are maintained under conditions of equal wear only when angular relationships are provided according to the principles hereinafter detailed.

Consider a point A on the surface 26 of the arcuate segment 20′ coinciding with a point B on the surface 16 of the wedge segment 10′ when the ring is first assembled inside the cylinder 3. As the above described wearing action takes place the point A will move outwardly along a line A–A′ parallel to the radial line CD to a new position indicated as A′ on the surface 26′. In like manner the point B of the surface 16 will move outwardly along a line B–B′ parallel to the line CE to a new position shown as B′ on the surface 16′.

Figure 3:
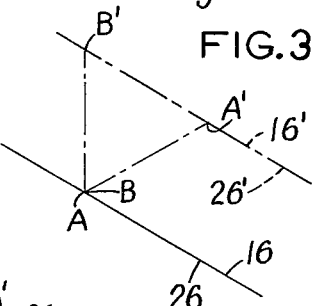
FIG. 3 is a diagrammatic representation of certain angular relationships found in FIG. 2.

Since the configuration of the segments 10 and 20 provides that wear takes place at an equal rate as regards a radial dimension, AA′ is equal to AB′. The angles of the small triangles AB′A′ (shown much larger in FIG. 3 for purposes of clarity) then have the following relationships:

since $AA'=AB'$ as described then $\angle A'=\angle B'$ being angles opposite equal sides of a triangle but $\angle A'+\angle B'=180°-\angle A$, the sum of the angles of any triangle being 180° then $2\angle B'=180°-\angle A$ by substitution however $\angle B'=\angle 17$ because their sides are parallel and extend in the same direction but $2\angle 17=\angle 18$ as stated therefore $2\angle B'=\angle 18$ by substitution and $\angle 18=180°-\angle A$ by further substitution however $\angle A=\angle 19$, parallel sides as above therefore $\angle 18=180°-\angle 19$ by substitution but $\angle 19=\dfrac{360°}{N}$ where $N$ is the total number of segments 10 and 20 taken together therefore $\angle 18=180°-\dfrac{360°}{N}$ or $\dfrac{180°\,(N-2)}{N}$ by substitution which is the well recognized formula for the size of each angle of a regular polygon of N sides. Another expression of the same relationship shows that since $N=2S$ where S is the number of segments in either set of segments $$\angle 18=\dfrac{180°\,(S-1)}{S}$$

Application of either of the above formulas to the six piece ring 8 of FIG. 2 yields the stated value of 120° for the angle 18 between the side surfaces 16.

It is to be realized that the number of degrees found by application of the above formulas is an optimum value resulting in maximum useful life of the ring because of equal rates of wear on the two sets of segments and maintaining the efficiency of the compressor by providing gapless configuration throughout the useful life of the ring. However, slight deviations from the optimum figure due to manufacturing methods are to be expected and will not significantly affect the desired result. Larger deviations from the optimum figure are commercially acceptable since some unequal wear can be tolerated as other factors prevent complete wearing out of any of the segments. In the case of angle 18, normally 120°, an angle as large as 130° or as small as 110° is believed to be within the scope of this invention under various conditions as hereinafter more fully explained.

Other larger angles, hereinafter derived by applying the formula to rings having larger numbers of segments, are also to be considered as representing an optimum value in a range of acceptable values and should not be construed as being limited to the exact number of degrees found by strict application of the formulas. The acceptable range of values is dependent in part on the physical dimensions of the ring as well as the number of segments and the servicing schedule of a particular application. Hence, the range of values cannot be precisely expressed for all the various designs which fall within the scope of this invention. Experimentation and field trials would be necessary to determine the full range of values covered by this principle.

In the appended claims the term nominal is used to indicate that the angle derived from the formula may be varied over a substantial range. The phrase unequal wear refers to more rapid wearing of one of said sets of segments than the other of said sets of segments. Such unequal wear becomes objectionable when one type of segment consistently becomes inoperative due to excessive wear before the other type of segment is substantially completely worn out.

Figure 4:
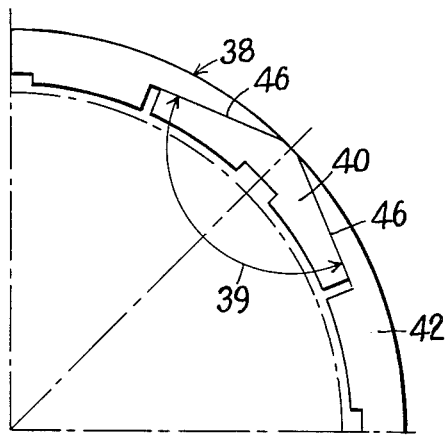
FIG. 4 is a fragmentary top plan view of a piston ring of 8 segments constructed according to the principles of this invention.

In FIG. 4 there is shown a portion of a piston ring 38 constructed according to the principles of this invention and similar to the piston ring 8 of FIGS. 1 and 2 except that the ring 38 has four wedge segments 40 and four arcuate segments 42 rather than three of each as shown in FIG. 2. The side surfaces of segments 40 analogous to side surfaces 16 of the ring 8 (see FIG. 2) are indicated as surfaces 46. Application of either of the above derived formulas shows that the angle 39 between the surfaces 46 (corresponding to angle 18 of FIG. 2) should be 135° as shown in FIG. 4.

Figure 5:
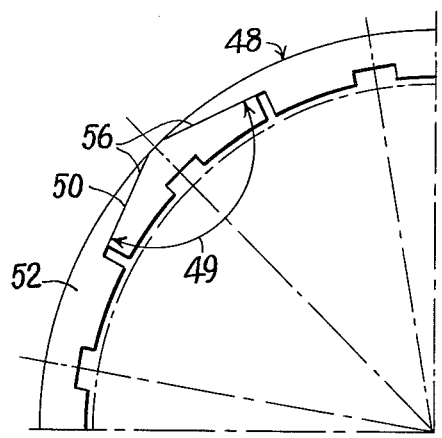
FIG. 5 is a fragmentary top plan view of a piston ring of 10 segments constructed according to the principles of this invention.

In like manner FIG. 5 shows a portion of a piston ring 48 having five wedge segments 50 and five arcuate segments 52. The angle 49 between the side surfaces 56 of the wedge segment 50 is equal to 144° as derived from the above formulas.

Figure 6:
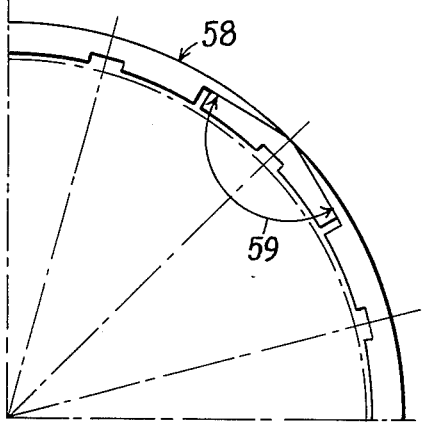
FIG. 6 is a fragmentary top plan view of a piston ring of 12 segments constructed according to the principles of this invention.
Figure 7:
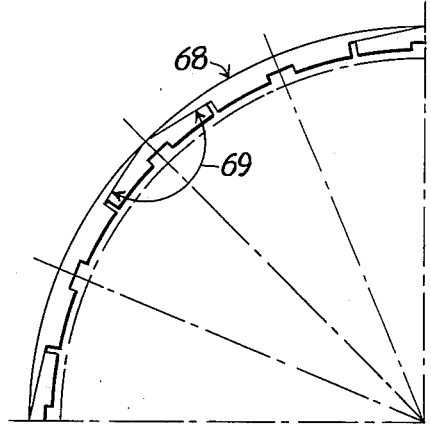
FIG. 7 is a fragmentary top plan view of a piston ring of 16 segments constructed according to the principles of this invention.

Similarly FIGS. 6 and 7 show portions of piston rings 58 and 68 having twelve and sixteen segments, respectively, equally divided between wedge segments and arcuate segments. The angles of FIGS. 6 and 7, corresponding to angle 18 of FIG. 2, shown as 59 and 69, respectively, are equal to 150° and 157½° as determined by either of the above formulas. As long as equal numbers of segments are used in each of the two sets of segments the required angle to yield gapless configuration and coplanar engagement with equal wear on all segments, for any number of segments per set greater than one, can be derived from either of the above formulas.

It is to be appreciated that although this invention has been described with relation to carbon piston ring segments the principles of this invention are applicable to segmented piston rings formed of different material.

Having described preferred embodiments of this invention in accordance with the patent statutes, it is to be realized that modifications thereof may be made without departing from the broad spirit of this invention. Accordingly it is respectfully requested that this invention be interpreted as broadly as possible and be limited only by the prior art.

I claim:

1. A piston ring assembly comprising: a first set of segments, a second set of segments having the same number of segments as said first set of segments, segments of said first set of segments alternating with segments of said second set in coplanar abutting engagement therewith to form a piston ring with a portion of the circumference of said piston ring being formed by each of said segments, each of said sets of segments comprising at least three segments, each of said segments of said first set of segments having a pair of angularly disposed side surfaces extending convergently outwardly of said ring, said side surfaces defining an obtuse angle A with each other, said obtuse angle A having a number of degrees given by the formula $A = 180° \ (S-1) \div S$ in which S is equal to the number of segments in each set of segments, each of said segments of said second set of segments having surfaces in engagement with said side surfaces of the adjacent segments of said first set of segments respectively.

2. A piston ring assembly comprising: a first set of three segments, a second set of three segments, segments of said first set of segments alternating with segments of said second set in coplanar abutting engagement therewith to form a piston ring with a portion of the circumference of said piston ring being formed by each of said segments, each of said segments of said first set of segments having a pair of angularly disposed side surfaces extending convergently outwardly of said ring, said side surfaces defining an angle of 120°, each of said segments of said second set of segments having surfaces in engagement with said side surfaces of the adjacent segments of said first set of segments respectively.

3. A piston ring assembly comprising: a first set of four segments, a second set of four segments, segments of said first set of segments alternating with segments of said second set in coplanar abutting engagement therewith to form a piston ring with a portion of the circumference of said piston ring being formed by each of said segments, each of said segments of said first set of segments having a pair of angularly disposed side surfaces extending convergently outwardly of said ring, said side surfaces defining an angle of 135°, each of said segments of said second set of segments having surfaces in engagement with said side surfaces of the adjacent segments of said first set of segments respectively.

4. A piston ring assembly comprising: a first set of segments, a second set of segments having the same number of segments as said first set of segments, segments of said first set of segments alternating with segments of said second set in coplanar abutting engagement therewith to form a piston ring being formed by each of said segments with a portion of the circumference of said piston ring, each of said sets of segments comprising at least three segments respectively, each of said segments of said first set of segments having a pair of angularly disposed side surfaces extending convergently outwardly of said ring, said side surfaces defining an obtuse angle bisected by a diameter of said piston ring, said obtuse angle being equal to one angle of a regular polygon having a number of sides equal to the total number of segments in said two sets of segments, each of said segments of said second set of segments having surfaces in engagement with said side surfaces of the adjacent segments of said first set of segments respectively.

5. A piston ring assembly comprising: a first set of segments, a second set of segments having the same number of segments as said first set of segments, segments of said first set of segments alternating with segments of said second set in coplanar abutting engagement therewith to form a piston ring with a portion of the circumference of said piston ring being formed by each of said segments, each of said sets of segments comprising at least three segments respectively, each of said segments of said first set of segments having a pair of angularly disposed side surfaces extending convergently outwardly of said ring, said side surfaces defining an obtuse angle bisected by a diameter of said piston ring, said obtuse angle having a value equal to $180° \ (S-1) \div S$ in which S is the number of segments in each set of segments, each of said segments of said second set of segments having surfaces in coplanar engagement with said side surfaces of the adjacent segments of said first set of segments respectively.

6. A piston assembly comprising: a piston having a circumferential groove therein, a piston ring assembly located in said groove, said piston ring assembly having a first set of segments, a second set of segments having the same number of segments as said first set of segments, segments of said first set of segments alternating with segments of said second set in coplanar abutting engagement therewith to form a piston ring located in said groove to extend outwardly therefrom with a portion of the circumference of said piston ring being formed by each of said segments, each of said sets of segments comprising at least three segments respectively, each of said segments of said first set of segments having a pair of angularly disposed side surfaces extending convergently outwardly of said ring, said side surfaces defining an obtuse angle bisected by a diameter of said piston ring, said obtuse angle haviing a nominal value equal to $180° (S-1) \div S$ in which S is the number of segments in each set of segments, said obtuse angle falling within a range of values which includes angular variations from said nominal value which do not cause objectionably unequal wear on said two sets of segments respectively, each of said segments of said second set of segments having surfaces in engagement with said side surfaces of the adjacent segments of said first set of segments respectively.

7. A piston ring assembly comprising: a first set of three segments, a second set of three segments, segments of said first set of segments alternating with segments of said second set in coplanar abutting engagement therewith to form a piston ring with a portion of the circumference of said piston ring being formed by each of said segments, each of said segments of said first set of segments having a pair of angularly disposed side surfaces extending convergently outwardly of said ring, said side surfaces defining an angle falling in the range of angles between 110° and 130°, each of said segments of said second set of segments having end surfaces in engagement with one of said side surfaces of the adjacent segments of said first set of segments respectively.

References Cited by the Examiner

UNITED STATES PATENTS

| 397,991 | 10/88 | Tripp | 277—199 |
| 920,327 | 5/09 | Allen | 277—150 |
| 965,355 | 7/10 | Allen | 277—149 X |
| 2,768,040 | 10/56 | Green | 277—148 |
| 2,911,271 | 11/59 | Kodra et al. | 277—150 |
| 2,925,306 | 2/60 | Kodra et al. | 277—149 |

LEWIS J. LENNY, *Primary Examiner.*

EDWARD V. BENHAM, *Examiner.*